(12) United States Patent
Mikan

(10) Patent No.: US 7,366,528 B1
(45) Date of Patent: Apr. 29, 2008

(54) PREVENTING WIRELESS MESSAGE DELIVERY OUTSIDE OF SPECIFIED TIMES

(75) Inventor: Jeffrey Mikan, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 800 days.

(21) Appl. No.: 10/756,692

(22) Filed: Jan. 13, 2004

(51) Int. Cl.
 *H04Q 7/20* (2006.01)

(52) U.S. Cl. .................. 455/466; 455/412.1; 455/412.2

(58) Field of Classification Search ............... 455/466, 455/412.1, 412.2, 413, 414.1, 517; 379/88.22, 379/93.24; 709/206, 207
See application file for complete search history.

(56) References Cited

U.S. PATENT DOCUMENTS

| | | | |
|---|---|---|---|
| 5,398,021 A | | 3/1995 | Moore |
| 5,901,226 A | * | 5/1999 | Brenner et al. ............. 455/437 |
| 5,909,651 A | | 6/1999 | Chander et al. |
| 5,943,399 A | | 8/1999 | Bannister et al. |
| 6,006,085 A | | 12/1999 | Balachandran |
| 6,289,223 B1 | | 9/2001 | Mukherjee et al. |
| 6,424,841 B1 | | 7/2002 | Gustafsson |
| 6,854,007 B1 | * | 2/2005 | Hammond .................. 709/206 |
| 6,912,402 B1 | * | 6/2005 | Haumont et al. ........... 455/519 |
| 6,928,290 B2 | | 8/2005 | Byers et al. |
| 7,099,959 B1 | * | 8/2006 | Budde et al. ............... 709/252 |
| 2001/0006897 A1 | | 7/2001 | Kang et al. |
| 2002/0119793 A1 | | 8/2002 | Hronek et al. |
| 2002/0120697 A1 | * | 8/2002 | Generous et al. ........... 709/206 |
| 2002/0187794 A1 | | 12/2002 | Fostick et al. |
| 2003/0045273 A1 | * | 3/2003 | Pyhalammi et al. ........ 455/412 |
| 2003/0172121 A1 | | 9/2003 | Evans et al. |
| 2004/0019695 A1 | * | 1/2004 | Fellenstein et al. ......... 709/239 |
| 2004/0203614 A1 | * | 10/2004 | Qu et al. .................. 455/412.1 |
| 2005/0033845 A1 | * | 2/2005 | Perepa et al. ............... 709/226 |

FOREIGN PATENT DOCUMENTS

| | | |
|---|---|---|
| EP | 0825790 | 2/1998 |
| WO | WO97/28518 | 8/1997 |
| WO | WO0178422 | 10/2001 |

OTHER PUBLICATIONS

SMPP Developers Forum, "Short Message Peer to Peer Protocol Specification v.3.4," Document Version: Oct. 12, 1999, Issue 1.2, pp. 1-169.

"Wireless Short Message Service (SMS)," Web ProForum Tutorials, The International Engineering Consortium, downloaded Jul. 18, 2003 from URL: http://www.iec.org, pp. 1-18.

"Short Message Service", Mar. 12, 2002, http://www.webopedia.com/TERM/S/short_message_service.html, 2 pages.

U.S. Appl. No. 10/623,197, filed Jul. 18, 2003, entitled "Short Message Delivery Management," naming inventors Jeffrey Mikan, John Lewis and Justin McNamara, 33 pages.

* cited by examiner

*Primary Examiner*—Melur Ramakrishnaiah
(74) *Attorney, Agent, or Firm*—Zagorin O'Brien Graham LLP

(57) ABSTRACT

A wireless messaging system includes a message controller and a delivery controller. The message controller provides a message to be delivered, and the delivery controller handles transmission of the message to a wireless device. To prevent delivery of a message after a desired expiry time or when a delivery window is closed, the message controller sends a cancellation request to the delivery controller. In response to the cancellation request, the delivery controller cancels any previously scheduled delivery attempts, and inhibits scheduling of future delivery attempts, at least temporarily.

26 Claims, 4 Drawing Sheets

PREVENTING WIRELESS MESSAGE DELIVERY OUTSIDE OF SPECIFIED TIMES

BACKGROUND

1. Field of the Invention

This invention relates generally to delivering wireless messages, and more particularly to preventing delivery of wireless messages outside of specified times.

2. Description of the Related Art

As message delivery to mobile phones, pagers, and other similar wireless devices becomes more commonplace, issues relating to time of delivery are becoming more of a concern. A particular wireless user, for example, may want to receive messages on his wireless device during business hours, but may be annoyed if he is interrupted by a wireless message during the evening or at night. In the interest of maintaining consumer goodwill, a wireless company may wish to prevent delivery of messages to this user during non-business hours, on holidays, or during other times that receipt of messages may be considered inconvenient.

Current delivery systems allow for an expiry time to be included with each message to be delivered, but because of the way in which most delivery systems are implemented, an attempt to deliver a message may be made even though the message has expired. Typical current delivery systems handle expired messages as described in the following example. Assume that delivering a message after five o'clock in the afternoon is undesirable, and so an expiry time of five o'clock is set for a particular message. If an unsuccessful delivery attempt is made at five minutes before five o'clock pm, the delivery system checks to see if the message has expired. If the message has not expired, and in this example it has not, the system schedules a redelivery attempt at some later time, for example six o'clock pm. At six o'clock pm, the system again attempts to deliver the message, even though the message has expired. If the delivery attempt is unsuccessful, the system again checks the expiry time on the message. Since the message has expired, the system does not schedule the message for another redelivery attempt.

As should be apparent from the above discussion, some current message delivery systems are not well adapted for providing messages to wireless devices only during specified times.

SUMMARY

A wireless messaging system according to an embodiment of the present invention includes a message controller and a delivery controller. The message controller provides messages to the delivery controller, and the delivery controller handles transmission of the messages to one or more wireless devices. To prevent delivery of a message outside of a desired time window, the message controller sends a cancellation request to the delivery controller. In response to the cancellation request, the delivery controller inhibits delivery of the message, e.g. any previously scheduled delivery attempts are canceled, and no future delivery attempts are scheduled outside of the desired time window. In this way, delivery of messages to wireless devices can be prevented during undesired time periods.

In at least one embodiment, a method for use in a wireless messaging system includes receiving a request to cancel delivery of a wireless message if delivery of the message has not been confirmed prior to expiration of a desired time period. In response to the cancellation request, delivery of the wireless message after expiration of the desired time period is prevented, at least temporarily. In at least one embodiment, the cancellation request is received after the message has already been scheduled for transmission. In other embodiments, the cancellation request is received by the delivery controller at the same time the message is received for transmission.

In some embodiments, the cancellation request is provided by a message controller to a delivery controller. The message controller and the delivery controller may be part of a short messaging center (SMC), or the message controller may be a processing system coupled to the delivery controller via the Internet or some other communications network. Certain embodiments are adapted for use with a recurring time period, and methods according to these embodiments may include receiving a request to deliver a message during the recurring time period, and enabling delivery of the wireless message in response to the delivery request.

Methods according to other embodiments include tracking a message identifier associated with the message to be delivered. If it is determined that the message has not been delivered to a messaging device prior to a first specified time, the message is prevented from being transmitted to the messaging device until after a second specified time. The delivery status of the message may be tracked by using a delivery controller to obtain a delivery receipt from the messaging device, and obtaining information associated with the delivery receipt from the delivery controller. The message controller uses the information to determine if further message deliveries should be attempted. Based on the determination, the message controller sends a delivery request specifying a time after which delivery attempts are to resume, or a cancellation request.

Yet another method according to an embodiment of the present invention includes inhibiting transmission of an undelivered wireless message in response to a recurring time window closing, and enabling transmission of the undelivered wireless message in response to the recurring time window reopening.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
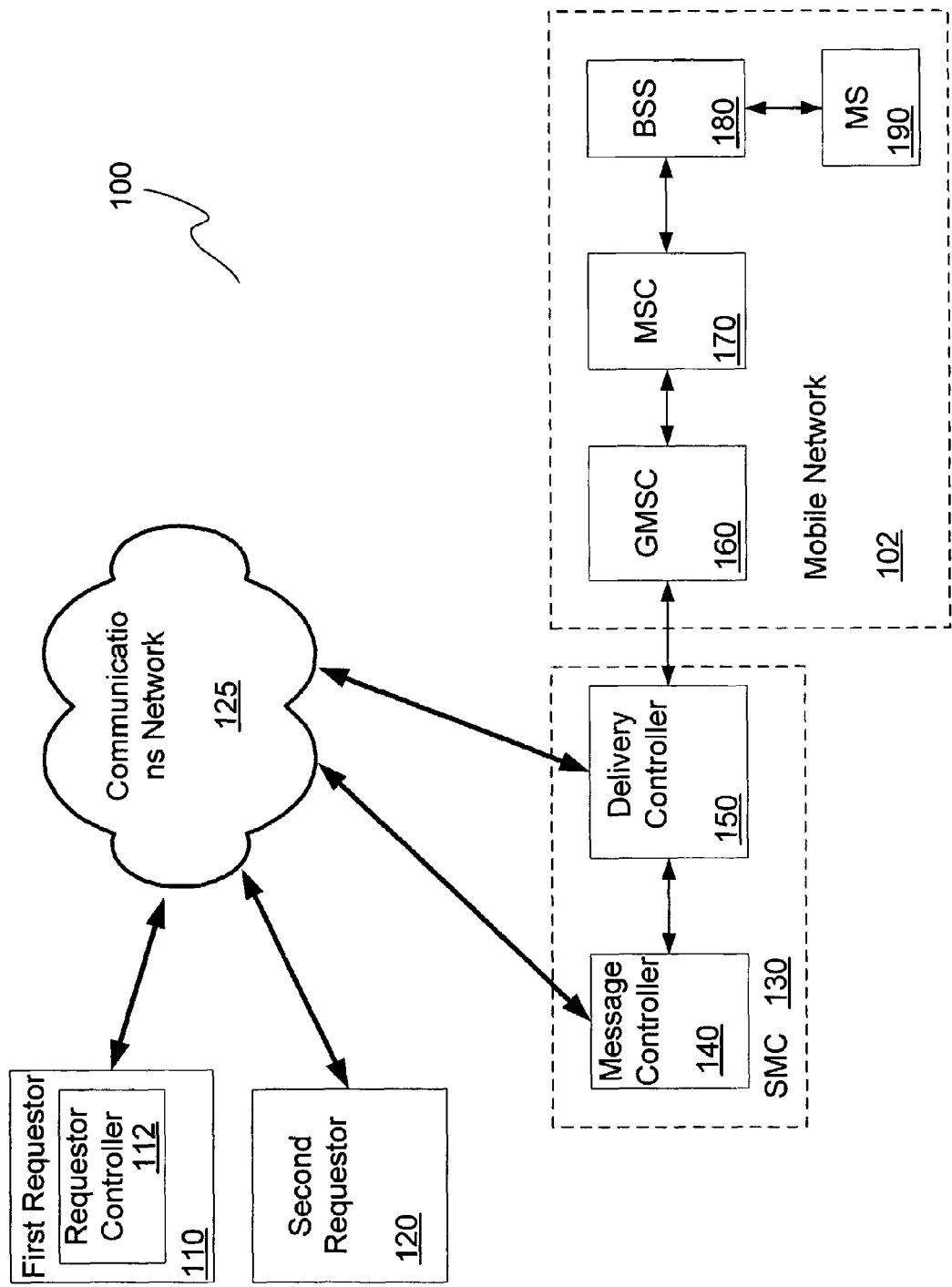
FIG. 1 is a block diagram of a message delivery system according to an embodiment of the present invention.

Referring first to FIG. 1, a wireless messaging system according to an embodiment of the present invention is illustrated, and designated generally as system 100. The major components of system 100 include short message center (SMC) 130 and mobile network 102. SMC 130 provides store-and-forward functionality for wireless messages received from first requestor 110 and second requestor 120 via communications network 125. Mobile network 102 delivers messages received from SMC 130.

The illustrated embodiment of SMC 130 includes message controller 140 and delivery controller 150. Message controller 140 receives messages from second requestor 120, and provides the messages to delivery controller 150. In some embodiments, message controller 140 provides a delivery request and/or a cancellation request to delivery controller 150, along with the message to be delivered. In response to receiving a message to be delivered from message controller 140 (or in response to a delivery request), delivery controller 150 attempts to deliver the message. Delivery controller 150 may immediately attempt to deliver the message, or schedule a delivery attempt at some future time.

When delivery controller 150 attempts to deliver a message, it does so by providing the message to mobile network 102 through gateway message center (GMSC) 160. Upon receiving the message from SMC 130, GMSC 160 uses a common channel signaling network, such as the signaling system 7 (SS7) network, to determine the current position of a wireless device, for example mobile station (MS) 190, intended to receive the message. The message is then delivered to the mobile switching center (MSC) 170, which routes the message to the appropriate base station system (BSS) 180 for wireless transmission to MS 190.

The components making up system 100, as well as the specific arrangement of components within system 100, may be varied by those skilled in the art. For example, in some embodiments, system 100 does not include both first requestor 110 and second requestor 120. In other embodiments, wireless devices such as MS 190, for which messages are intended, may or may not be a part of mobile network 102. The device may, instead, be part of a different mobile network, a local area network (not illustrated) connected to mobile network 102 over a wireless channel, or the like.

Additionally, it should be appreciated that although system 100 is illustrated and described herein as employing a short messaging protocol, systems employing other suitable message protocols may be used without departing from the spirit and scope of the teachings set forth herein. In various embodiments the wireless message may be not only a short messaging service message, but an enhanced messaging service message, a multimedia messaging service message, or a wireless application protocol message.

System 100 may be used to implement various methods according to embodiments of the present invention. In at least one embodiment, both first requestor 110 and second requestor 120 provide SMC 130 with a message to be delivered to MS 190, via communications network 125. Consider first the case involving second requestor 120.

Second requestor 120 may be a merchant, a service provider, an association, a group, a government body, an individual or other entity desiring to send a message to a wireless device. Second requester 120 may deliver messages to SMC 130 over a communications network 125, for example the Internet. Various methods of connecting second requester 120 to SMC 130, for example via a virtual private network, a secure Internet connection, or the like, can be implemented by those skilled in the art.

Second requestor 120 provides the message to message controller 140, along with any desired delivery information, such as delivery time restrictions, a maximum number of times to attempt delivery, an expiration time, an expiration date, or the like. Message controller 140 checks the delivery information to verify that the message is to be currently delivered, and sends the message to delivery controller 150. Message controller 140 may, in certain embodiments, send a delivery request indicating a time to begin attempting delivery, a cancellation request indicating a time to stop attempting delivery, or the like, to delivery controller 150 along with the message to be delivered. In at least one embodiment, however, message controller 140 sends the message to delivery controller 150, and delivery controller 150 attempts delivery of the message in response to receipt of the message.

Delivery controller 150 delivers the message to MS 190 using mobile network 102. In at least one embodiment, mobile network 102 uses the short messaging system (SMS) protocol, or one of various other protocols, which allow for delivery receipts to be generated by MS 190 upon receipt of a valid message. In the illustrated embodiment, after providing a message to mobile network 102, delivery controller 150 waits for a delivery receipt from MS 190. If no delivery receipt is forthcoming, delivery controller 150 may check to see if the delivery time on the message has expired. If not, delivery controller 150 schedules another delivery attempt. Generally, no delivery attempts are scheduled to occur after the message's expiration time.

In at least one embodiment, delivery controller 150 notifies message controller 140 when a delivery receipt is received from MS 190. If a delivery receipt is received, no further delivery attempts are made, and message controller 140 notifies second requester 120 that the message has been successfully delivered. If no delivery receipt is received, however, message controller 140 assumes that the message has not been received, and more delivery attempts may be made. Message controller 140 will continue to check the delivery status of the message until the message is delivered, the message expires, the message is cancelled, etc.

Message controller 140 also checks the delivery requirements of each undelivered message to ensure that no messages are sent after the expiration of a delivery time, or outside of a desired time window. So, for example, if a message delivery requirement indicates that a message is to be delivered by 2 pm, and no delivery receipt has been received by that time, message controller 140 will send a cancellation request to delivery controller 150. Upon receipt of the cancellation request, delivery controller 150 will prevent delivery of the message. If necessary, delivery controller 150 will cancel scheduled delivery attempts.

In at least one embodiment, if the cancellation request was sent in response to the end of a recurring time window, the delivery controller 150 may automatically begin attempting delivery of the message when the beginning of the recurring time window next occurs. For example, if a message is to be delivered between 9 am and 5 pm, Monday through Friday, message controller 140 may send a cancel request to delivery controller 150 at about 5 pm on Monday. In response to the cancel request, delivery controller 150 will cancel any pending delivery attempts, and schedule the next delivery attempt after 9 am on Tuesday, without any prompting from message controller 140. Alternatively, after receiving a cancellation request from message controller 140, delivery controller 150 may cancel all pending deliveries of the message, and inhibit any future deliveries until controller 140 provides a delivery request In another embodiment, delivery controller 150 does not keep the message once delivery has been attempted. Instead, delivery controller 150 notifies message controller 140 of the delivery status of a message, for example whether a delivery receipt has been received or not, and message controller 140 is responsible for resubmitting the message to delivery controller 150 if message controller 140 determines that another delivery attempt should be made.

Still referring to FIG. 1, consider the case where first requestor 110 desires to send a message to MS 190. First requestor 110, like second requestor 120, communicates with SMC 130 over communication network 125. Unlike second requestor 120, however, the system used by first requestor 110 communicates with delivery controller 150, through requestor controller 112. Requestor controller 112 performs functions similar to those performed by message controller 140. For example, cancellation requests and delivery requests are sent from requestor controller 112 to delivery controller 150. Likewise, delivery status, including delivery receipt notifications, is sent from delivery controller 150 to requestor controller 112. Systems including requester controller 112 may provide message originators greater flexibility and control over message delivery to wireless devices.

Figure 2:
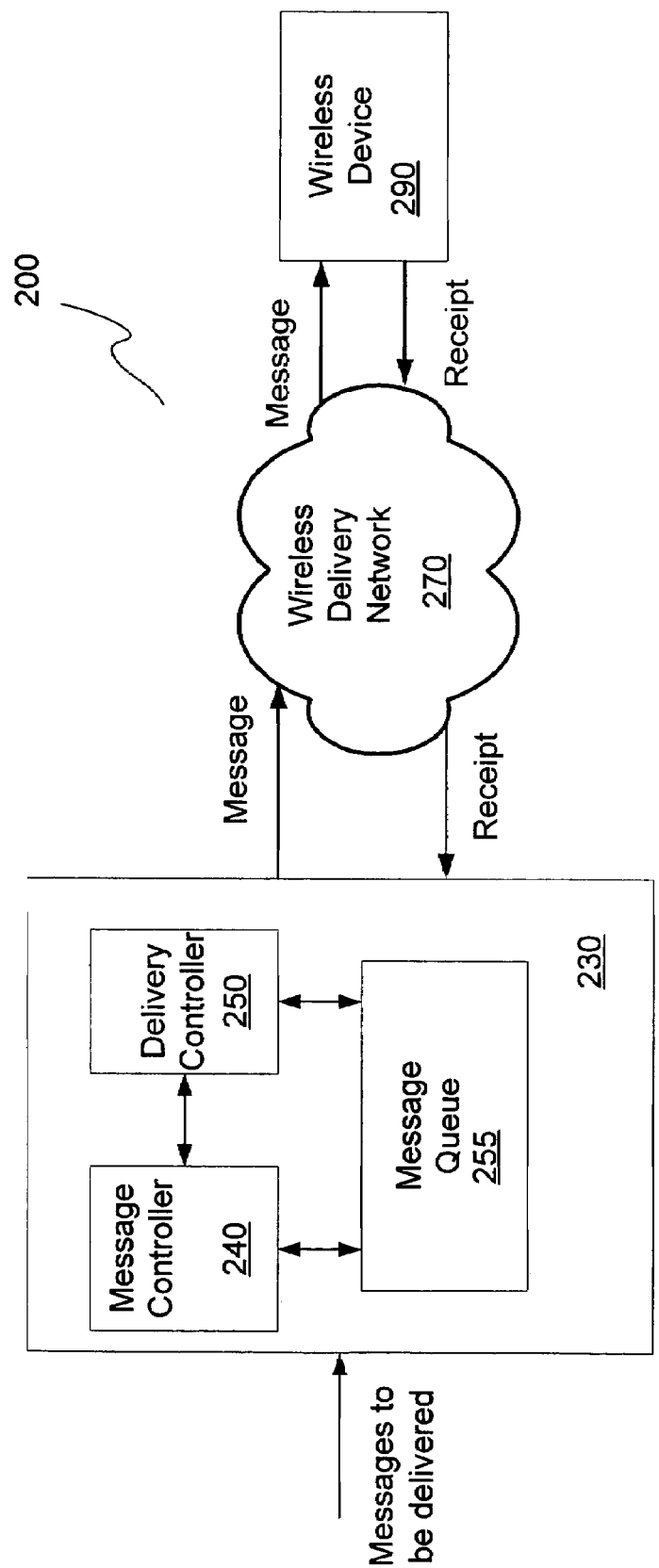
FIG. 2 is a block diagram of a portion of a wireless system including a message center according to an embodiment of the present invention.

Referring next to FIG. 2, a portion of a message delivery system according to an embodiment of the present invention is illustrated. System 200 includes a message center 230, a wireless delivery network 270, and wireless device 290. Message center 230 is, in one embodiment, a short messaging center (SMC), of the type commonly found in wireless networks, that has been modified to include a message controller 240, a delivery controller 250, and a message queue 255, as taught herein.

Messages to be delivered to wireless device 290 are received at message center 230, and held in message queue 255 pending delivery. In at least one embodiment, each message is assigned a message identifier upon receipt. The message identifier is used by message controller 240 and delivery controller 250 to track the delivery status of each message. In some embodiments, each message is associated with particular delivery parameters specifying expiration times, expiration dates, the beginning and end of delivery windows, periods during which no delivery attempts should be made, the number of delivery attempts to make, or the like. In other embodiments, some or all messages are subject to common delivery parameters, so there is no need to track delivery parameters for each individual message.

Message controller 240 accesses the delivery parameters for a particular message to be delivered, and determines if an attempt should be made to deliver the message to wireless device 290. If message controller 240 determines that a delivery attempt should be made, message controller 240 sends a request for delivery controller 250 to deliver the message. Delivery controller 250 can be configured so that receipt of a particular message identifier toggles the delivery status of a particular message, so that upon first receiving a message identifier, the delivery controller 250 will attempt to deliver the message associated with that identifier. In such embodiments, delivery controller 250 may be configured to cancel any delivery attempts upon a subsequent receipt of the same message identifier. In other embodiments, the message identifier is delivered to delivery controller 250 along with an action indicator, such as a delivery request or a cancel request, and delivery controller 250 takes the appropriate action.

Upon receipt of a delivery request, in whatever form that request may take, delivery controller 250 attempts to deliver the message to wireless device 290 via wireless delivery network 270. If wireless device 290 receives the message, the device sends a delivery receipt back to delivery controller 250 over wireless delivery network 270. Delivery controller 250 notifies message controller 240 when a delivery receipt has been received. If the message is no longer needed, message controller 240 removes the delivered message from the message queue 255 and sends any necessary notifications.

If a delivery attempt is made, but no delivery receipt is received at delivery controller 250 within a desired period of time, delivery controller 250 schedules another delivery attempt. In some forms of the invention, the delivery controller 250 may continue to attempt delivery until a cancel request is received from message controller 240. In other forms, delivery controller will check the expiration time and date of the message, and cease delivery attempts after the message has expired. Regardless of how much of the message verification process is included in delivery controller 250, upon receipt of a cancel request from message controller 240, delivery controller 250 will inhibit any delivery attempts of the cancelled message, even if another delivery attempt has been previously scheduled.

Message controller 240 and delivery controller 250 may be implemented as separate sub-units in a single message center, as illustrated in FIG. 2. Alternatively, message controller 240 and delivery controller 250 may be combined, for example on one or more circuit boards having one or more integrated circuits. Regardless of the exact form in which message controller 240 and delivery controller 250 are implemented, message controller 240 and delivery controller 250 function as indicated herein, or in an equivalent manner.

Figure 3:
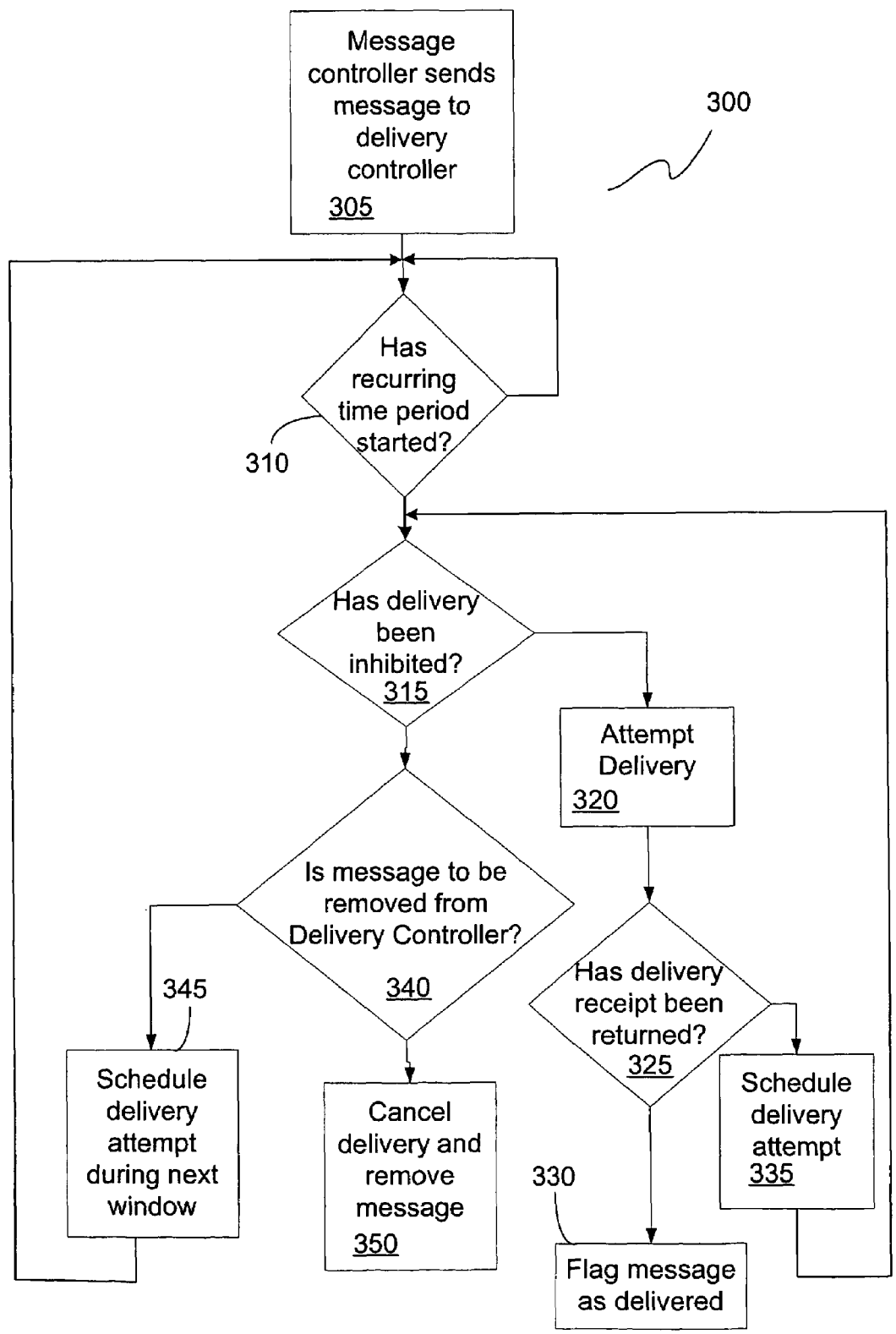
FIG. 3 is a flow diagram illustrating a method according to an embodiment of the present invention.

Refer next to FIG. 3, which illustrates a method according to an embodiment of the present invention. Method 300 begins at 305 with a message controller sending a message to a delivery controller for transmission to a wireless device. Along with the message itself, the message controller may send a delivery start time, which instructs the delivery controller when to begin attempting to deliver the message. In at least one embodiment, the message is stored by the delivery controller to allow multiple delivery attempts.

At 310, the delivery controller checks the delivery start time, which may be the beginning of a recurring time period, to see if it is time yet to begin delivery attempts. If the time period for delivery has not yet begun, the method loops back to 310, where the delivery controller continues to check whether it is time to begin delivery attempts. If the beginning of the time period for delivery has passed, the method proceeds to 315.

At 315, the delivery controller checks to see if delivery attempts have been inhibited due to receipt of a cancel request, because the current time is outside of a delivery window, or otherwise. If delivery is not inhibited, the method proceeds to 320, and delivery is attempted. After a delivery attempt, the method goes on to 325, and checks for a delivery receipt indicating that the message was received by the wireless device for which it was intended. If no delivery receipt is returned to the delivery controller, another delivery attempt is scheduled at 335. At the time scheduled for the delivery attempt, the method returns to 315.

If a delivery receipt has been returned, the method proceeds from 325 to 330, and flags the message as delivered. In one embodiment, flagging the message as delivered includes sending a delivery receipt verification from the delivery controller to the message controller, and allowing the message controller to handle any further actions. In other embodiments, flagging the message may include setting an indicator bit to identify the message as "delivered."

If the method at 315 indicates that delivery of the message has been inhibited, the method proceeds to 340, where the message controller or the delivery controller determine if the message is to be removed from the delivery controller because the message has expired. Note that if the message has been inhibited because a recurring time window has temporarily closed, but the message has not yet expired, some embodiments will determine that the message should not be removed from the delivery controller.

If the message is not to be removed from the delivery controller, the method proceeds to 345, where another delivery attempt is scheduled during the next available time window. The method then returns to 310. If it is determined at 340 that the message is to be removed from the delivery controller, which would be the case if a message had expired, any scheduled delivery attempts are cancelled, and the message is deleted from the delivery controller. Once a message is deleted, it is resubmitted to the delivery controller if further delivery attempts are desired.

Figure 4:
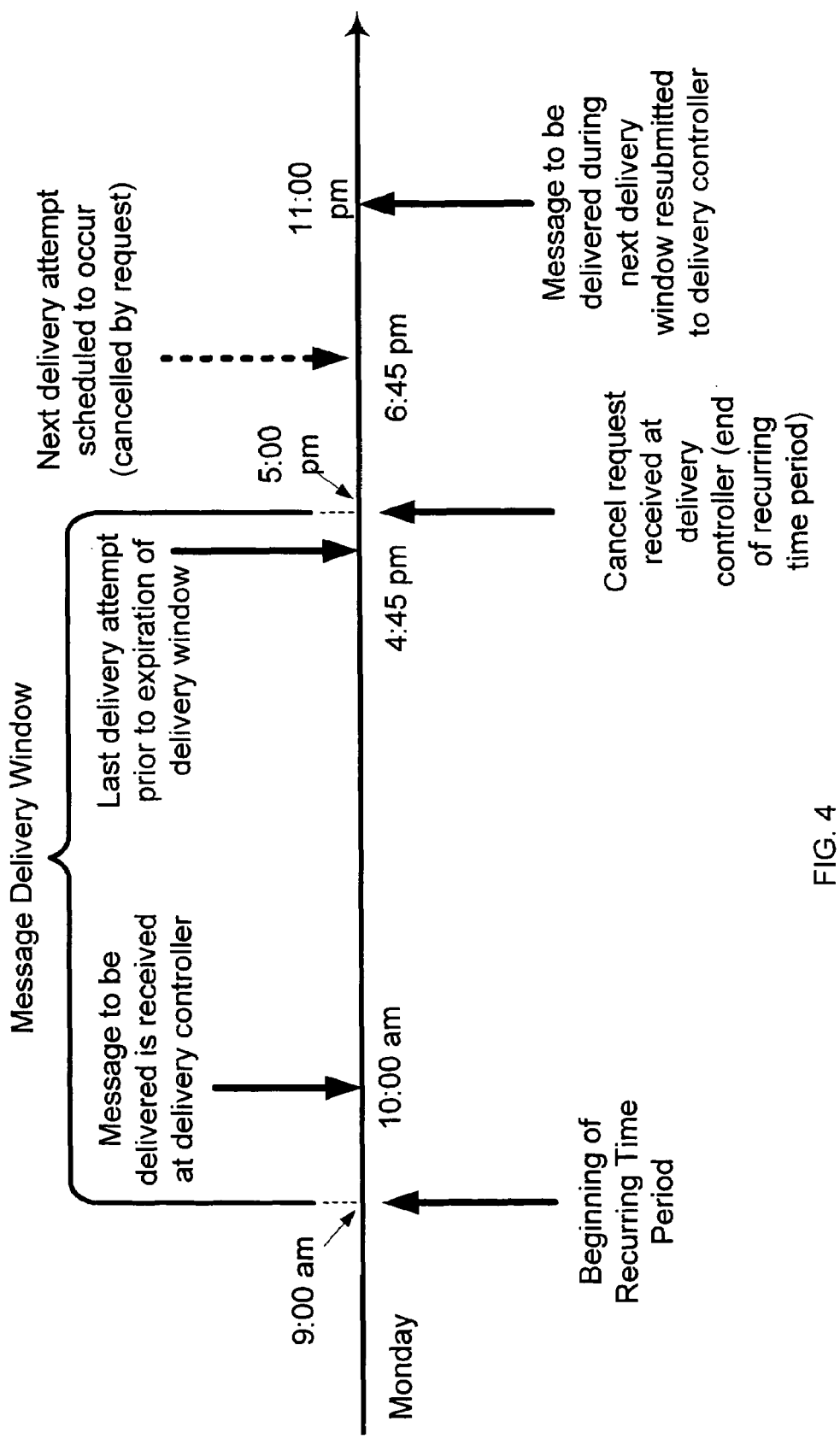
FIG. 4 is a timeline illustrating an exemplary sequence of events according to an embodiment of the present invention.

Referring next to FIG. 4, an exemplary delivery sequence is discussed according to an embodiment of the present invention. For purposes of the following example, assume that a message is to be delivered to a wireless device only if the message can be delivered during a weekday between 9 am and 5 pm.

The message delivery window 410 represents a recurring window that opens at 9 am and closes at 5 pm every weekday. Monday at 9 am, the beginning of the recurring time period, there is no message to be delivered to the wireless device. At 10 am on Monday a message is provided to a delivery controller for delivery to the wireless device. Between 10 am and 4:45 pm, the delivery controller attempts to deliver the message approximately every two hours. All delivery attempts are unsuccessful. A final delivery attempt is made at 4:45, just prior to delivery window 410 closing. When the delivery controller realizes that the 4:45 delivery attempt has been unsuccessful, e.g. because no delivery receipt has been received, the delivery controller schedules its next delivery attempt for 6:45 pm. Note that this delivery attempt is scheduled to occur outside of the message delivery window.

To prevent a delivery attempt from occurring outside of the message delivery window 410, a message controller sends a cancel request to the delivery controller. In response to the cancel request, the delivery controller cancels the scheduled delivery attempt, and deletes the message. At 11 pm Monday night, the message controller resubmits the message to the delivery controller with instructions to begin attempting delivery of the message at 9 am Tuesday.

The exact sequence of events illustrated in FIGS. 3 and 4 are presented for exemplary purposes only, and other sequences according to the present invention will become apparent to those skilled in the art upon consideration of this disclosure. The illustrated sequences do, however, provide examples of embodiments that require a minimum degree of modification to become compatible with currently available message delivery systems. That being said, it should be appreciated that other embodiments can also be implemented by modifying currently available wireless message delivery systems.

Although various embodiments of the present invention have been shown and described in detail herein, many other varied embodiments of the present invention may be practiced without departing from the teachings set forth herein. These embodiments can be readily constructed by those skilled in the art. Accordingly, the present invention is not intended to be limited to the specific form, or forms, set forth herein, but on the contrary, includes such alternatives, modifications and equivalents, as can be reasonably included within the spirit and scope of the invention.

What is claimed is:

1. A method for use in a wireless messaging system, the method comprising:

receiving a request to cancel delivery of a wireless message if delivery of the wireless message has not been confirmed prior to expiration of a desired time period, the request to cancel being received after rescheduling a transmission of the wireless message for delivery and before the wireless message is transmitted, the retransmission being scheduled outside of the desired time period, the rescheduling occurring within the desired time period; and preventing delivery of the wireless message after expiration of the desired time period, at least temporarily, in response to the request.

2. The method of claim 1 wherein preventing delivery of the wireless message includes inhibiting retransmission of a message that has been previously sent but not received.

3. The method of claim 1 wherein the request to cancel delivery is provided by a message controller to a delivery controller, and wherein the delivery controller prevents delivery in response to the request.

4. The method of claim 3 wherein the message controller tracks receipt of delivery confirmations for particular wireless messages.

5. The method of claim 3 wherein the message controller includes a processing system coupled to the delivery controller via a communications network.

6. The method of claim 3 wherein the message controller and the delivery controller are both part of a short message center.

7. The method of claim 1 further including receiving a message to be delivered as a wireless message, wherein both the message to be delivered and the request to cancel delivery are provided by the message originator.

8. The method of claim 7 wherein the request to cancel delivery is received contemporaneously with the message to be delivered.

9. The method of claim 1 wherein confirmation that the wireless message has been delivered includes a delivery receipt generated by a wireless receiver in response to receiving the wireless message.

10. The method of claim 1 wherein the wireless message is one of a short messaging service message, an enhanced messaging service message, and multimedia messaging service message, or a wireless application protocol push message.

11. The method of claim 1 wherein the desired delivery time includes a recurring time period, and wherein the method further includes:

receiving a request to deliver the wireless message during the recurring time period; and enabling delivery of the wireless message in response to the request to deliver.

12. The method of claim 11 wherein the request to deliver occurs after preventing the delivery.

13. A method comprising:

tracking a message identifier associated with a message to be delivered to a wireless messaging device to determine if the message has been delivered prior to a first specified time; and if the message has not been delivered prior to the first specified time, canceling a transmission of the message scheduled for transmission after the first specified time and prior to a second specified time, and resubmitting the message for transmission after the second specified time.

14. The method of claim 13 wherein tracking a message identifier includes:
  obtaining, at a delivery controller, a delivery receipt from the wireless messaging device in response to the message being delivered to the wireless messaging device; and
  obtaining, at a message controller, information associated with the delivery receipt from the delivery controller.

15. The method of claim 14 wherein:
  tracking the message identifier includes obtaining the information associated with the delivery receipt prior to the first specified time; and wherein
  canceling the transmission of the message includes the message controller sending a cancel request to the delivery controller.

16. The method of claim 13 wherein:
  tracking the message identifier includes determining if delivery of a message is to be attempted; and
  wherein the method further includes notifying a delivery controller that delivery of the message is to be attempted after the second specified time.

17. The method of claim 16 wherein notifying the delivery controller includes submitting the message to the delivery controller.

18. The method of claim 13 further including providing the message to be delivered from a message controller to a delivery controller.

19. The method of claim 18 wherein the message controller and the delivery controller are part of a short message center.

20. The method of claim 18 wherein the message controller includes a processing system coupled to the delivery controller via a communications network.

21. A method for use in a wireless messaging system, the method comprising:
  inhibiting transmission of a wireless messaging communication outside of a specified time period if the wireless messaging communication has been previously sent but not received, the inhibiting including sending a cancel request after scheduling a transmission of the wireless messaging communication and before the wireless messaging communication is transmitted, the scheduled transmission being a retransmission scheduled outside of the specified time period, rescheduling being performed within the specified time period.

22. The method of claim 21 wherein a message controller determines whether the wireless messaging communication has been received based on whether a delivery receipt has been received.

23. A wireless messaging system comprising:
  a delivery controller to transmit a message to a wireless messaging device, the delivery controller being configured to reschedule transmission of the message for delivery outside of a specified time period, the rescheduling occurring during the specified time period; and
  a message controller to inhibit transmission of the message outside of the specified time period if the delivery controller has previously transmitted the message but confirmation of receipt from the wireless messaging device has not been received.

24. The wireless messaging system of claim 23, wherein the delivery controller and the message controller are part of a short messaging service center.

25. The wireless messaging system of claim 23, wherein the message controller is remotely coupled to the delivery controller via a communication network.

26. The wireless messaging system of claim 23 wherein the specified time period is recurring, and wherein the message controller is further to re-enable transmission of the message in response to the specified time period recurring.

* * * * *